3,406,188
PREPARATION OF ALPHA-TOCOPHERYL-
QUINONE
Wayne B. Fletcher, Chester, Pa., assignor to Sun Oil Company, Philadelphia, Pa., a corporation of New Jersey
No Drawing. Filed Mar. 27, 1964, Ser. No. 355,489
5 Claims. (Cl. 260—396)

ABSTRACT OF THE DISCLOSURE

Method for preparing alpha-tocopherylquinone by contacting alpha-tocopherol (vitamin E) with activated manganese dioxide in an inert atmosphere. These quinone compounds have particular utility as chemical intermediates for the preparation of the corresponding hydroquinones by conventional reduction methods. The hydroquinones are known to be useful for antioxidants particularly in foodstuffs. The quinone compounds and hydroquinone compounds are useful in the treatment of muscular dystrophies and atrophies (The Journal of Biological Chemistry, volume 183, p. 655, 1950).

---

This invention relates to vitamin E derivatives and more particularly to α-tocopherylquinone and the keto-ether oxidative dimer of α-tocopherol and a method for preparing them.

α-Tocopherylquinone is a valuable precursor for the corresponding hydroquinone which is a known valuable antioxidant and has particular utility as an antioxidant in foodstuffs. It is also reported that alpha-tocopherylquinone and alpha-tocopherylhydroquinone are useful in the treatment of muscular dystrophies and atrophies (The Journal of Biological Chemistry, volume 183, p. 655, 1950). Numerous methods for preparing α-tocopherylquinone have been reported in the literature. For example the subject compound has been prepared by reacting vitamin E with auric or ferric chloride or with silver nitrate (see L. I. Smith, Chem. of Vitamin E, Chem. Reviews, vol. 27, 287–329 (1940)).

An additional method has now been found whereby α-tocopherylquinone can be prepared from α-tocopherol utilizing activated manganese dioxide.

Briefly, the instant invention comprises contacting α-tocopherol with activated manganese dioxide at a temperature in the range of from 20° C. to the decomposition temperature of α-tocopherol for a period of time ranging between 10 seconds and 50 hours and subsequently recovering the α-tocopherylquinone and the keto-ether oxidative dimer of α-tocopherol.

"Activated manganese dioxide" is a well known material (see Evans, Quarterly Reviews, 13, pp. 61–70, 1959). It is a form of hydrated manganese dioxide and is generally prepared by reacting manganese sulfate with potassium permanganate in a hot aqueous solution in the presence of sufficient alkali to insure that the reaction mixture remains alkaline. After being washed with water, the resulting slurry is dried at 100–120° C. and activated manganese dioxide is recovered. It can also be prepared by reacting manganese sulfate and potassium permanganate in a hot aqueous solution in the absence of an alkali. The resulting aqueous mixture becomes strongly acidic and after drying the slurry at 100–120° C., activated manganese dioxide is recovered. Activated manganese dioxide is also prepared by heating manganese oxalate or manganese carbonate at 250° C. The resulting product can be used as produced or it can be washed with dilute aqueous nitric acid and subsequently dried at 230° C.

As stated above, in accordance with this invention, α-tocopherol is contacted with activated manganese dioxide to produce α-tocopherylquinone and the keto-oxidative dimer of α-tocopherol. The use of activated manganese dioxide is critical to the success of this invention since ordinary manganese dioxide is not operable herein. The α-tocopherol is preferably contacted with the activated manganese dioxide in the presence of a solvent and in an inert atmosphere. Examples of suitable solvents which can be used include chloroform, benzene, toluene, nitrobenzene, and dimethylformamide. Chloroform and benzene are the preferred solvents.

The temperature at which the α-tocopherol-activated-manganese dioxide mixture is heated can vary over a wide range. It has been found that substantial amounts of desired product are produced at a temperature as low as 20° C. If the α-tocopherol is not contained in a solvent, the maximum temperature to which the reaction mass can be heated is governed by the decomposition temperature of α-tocopherol. If, however, the α-tocopherol is dissolved in a solvent prior to the addition thereto of the activated manganese dioxide, the maximum temperature to which the reaction mass can be heated is governed by the boiling point of the solvent used at the pressure employed. While temperatures in the range of from about 20° C. to as high as 350° C. can be used in this invention, it is preferred that a temperature in the range of from 60° C. to 225° C. be used.

The time that the reaction mixture is heated can vary between 5 minutes and 25 hours. It is preferred that the heating time range between about 0.5 hour and 2 hours.

The molar ratio of activated manganese dioxide to α-tocopherol can also vary over wide limits. It has been found that if trace amounts of activated manganese dioxide are present in the reaction mass, there is produced some α-tocopherylquinone. It is preferred, however, in order to optimize the yield of α-tocopherylquinone, that the molar ratio of activated manganese dioxide to α-tocopherol range between about 1:100 and 100:1 with a molar ratio ranging between about 3:1 and 10:1 being most preferred.

Since the instant process involves a heterogeneous reaction system the recovery of the desired products is accomplished by first separating the solid manganese dioxide from the liquid phase by conventional methods such as filtration. To insure maximum recovery of the desired products the solid manganese dioxide is washed with a solvent corresponding to that used in the process. The filtrate and the washings are combined and evaporated to a dry residue. The residue is conveniently fractionated to recover the desired products by chromatographing on acid-washed alumina using petroleum ether (30–60° C.) as the principal eluant.

The following example serves to further illustrate the instant invention:

Example

To a solution of 1.0 g. α-tocopherol dissolved in 25 ml. of chloroform there was added 2.0 g. activated manganese dioxide. The resulting mixture was maintained at reflux temperature for two hours in a nitrogen atmosphere. At the end of the reaction time the mixture was cooled to ambient temperature and separation by filtration. The solid manganese dioxide was washed with 120 ml. of chloroform. The original filtrate and subsequent washings were combined and evaporated to dryness. There was recovered a residue which was chromatographed on acid-washed alumina using low boiling petroleum ether (30–60° C.) as the principal eluant. The first fraction obtained was a yellow oil whose infrared spectrum was identical to the ketoether oxidative dimer of α-tocopherol as reported in W. A. Skinner and P. Alaupovic, J. Org. Chem., 28, 2854 (1963). The next major fraction was identical in infrared and ultraviolet spectra and refractive index to α-tocopherylquinone as reported in P. Schudel et al., Helv.

Chim. Acta, 46, 333 (1963). The yield of oxidative dimer was 27% and that of α-tocopherylquinone was 50% based on α-tocopherol.

I claim:
1. Method for preparing α-tocopherylquinone which comprises contacting α-tocopherol with activated manganese dioxide in an inert atmosphere and thereafter recovering the desired product.
2. Method in accordance with claim 1 wherein the α-tocopherol is contacted with the activated manganese dioxide at a temperature in the range of from 20° C. to 350° C. for a period of time ranging between 10 seconds and 50 hours.
3. Method in accordance with claim 2 wherein the molar ratio of activated manganese dioxide to α-tocopherol is in the range of 1:100 to 100:1.
4. Method in accordance with claim 1 wherein the temperature is in the range of from 60° C. to 225° C. and the period of time is from 0.5 hour to 24 hours.
5. Method in accordance with claim 4 wherein the molar ratio of activated manganese dioxide to α-tocopherol is in the range of 3:1 to 10:1.

References Cited

UNITED STATES PATENTS

| | | | |
|---|---|---|---|
| 2,446,856 | 8/1948 | Smith | 260—396 |
| 2,856,414 | 10/1958 | Robeson et al. | 260—396 |
| 2,998,430 | 8/1961 | Sevizne | 260—345.5 |

OTHER REFERENCES

Mackenzie et al., J. Biological Chem., vol. 183 (1950) pp. 655–62 QP 501.J7.

Skinner et al., J. Org. Chem., vol. 28, 2854–8 (1963).

Schudel et al., Helv. Chim. Acta, vol. 46, pp. 333–43.

HENRY R. JILES, *Primary Examiner.*

J. M. FORD, *Assistant Examiner.*